United States Patent [19]

Jensen

[11] Patent Number: 5,095,945
[45] Date of Patent: Mar. 17, 1992

[54] ELECTRONIC TAPWARE

[75] Inventor: Phillip H. Jensen, Dandenong, Australia

[73] Assignee: Ryemetal Forgings (VIC) Pty. Ltd., Dandenong, Australia

[21] Appl. No.: 585,257

[22] PCT Filed: Mar. 15, 1989

[86] PCT No.: PCT/AU89/00100
§ 371 Date: Sep. 19, 1990
§ 102(e) Date: Sep. 19, 1990

[87] PCT Pub. No.: WO89/09312
PCT Pub. Date: Oct. 5, 1989

[30] Foreign Application Priority Data

Mar. 22, 1988 [AU] Australia ................. PI7372

[51] Int. Cl.$^5$ ............................................ F16K 11/24
[52] U.S. Cl. ............................ 137/607; 251/129.04
[58] Field of Search ............... 137/606, 607, 624.12, 137/624.15; 236/12.12; 251/129.04

[56] References Cited

U.S. PATENT DOCUMENTS

| | | | |
|---|---|---|---|
| 3,415,278 | 12/1968 | Yamamoto et al. | 137/607 |
| 3,639,920 | 2/1972 | Griffin et al. | |
| 4,345,621 | 8/1982 | Dunckhorst | 137/624.12 |
| 4,528,709 | 7/1985 | Getz et al. | 236/12.12 X |
| 4,589,435 | 5/1986 | Aldrich | 137/624.12 X |
| 4,653,534 | 3/1987 | Chung-Shan | 137/624.12 |
| 4,700,884 | 10/1987 | Barrett et al. | 236/12.12 |

FOREIGN PATENT DOCUMENTS

| | | |
|---|---|---|
| 66034 | 12/1982 | European Pat. Off. . |
| 3514640 | 4/1985 | Fed. Rep. of Germany . |
| 8404122 | 10/1984 | PCT Int'l Appl. . |
| 8404145 | 10/1984 | PCT Int'l Appl. . |
| 742585 | 12/1955 | United Kingdom ............. 236/12.12 |
| 1204770 | 9/1970 | United Kingdom . |

Primary Examiner—Stephen M. Hepperle
Attorney, Agent, or Firm—Fish & Richardson

[57] ABSTRACT

An electronic tap control unit for controlling water supply from a tap, forcep, system nozzle or the like is disclosed which comprises a water manifold (40) which has a plurality of inputs (46) for supplying water from a water supply. The supply inlets (46) are each provided with a solenoid valve (48, 50 and 52) which is controlled by a logic control circuit (14). The logic control circuit 14 is coupled to a detector (12) which detects the proximity of a user's hand to provide an output signal to cause the logic control circuit (14) to move through a sequence of water temperature and time range options until the user removes his hand from the proximity of the sensor (12) at a desired water temperature and time range. The logic control circuit (14) then outputs signals to the solenoid valves (48, 50 and 52) to cause water to be supplied through the inlets (46), to the manifold (40) and then to a tap, forcep, system nozzle or the like in accordance with the selected temperature and time range.

9 Claims, 7 Drawing Sheets

ELECTRONIC TAPWARE

The present invention relates to electronic tapware and more particularly to an electronic tap control unit for controlling the flow of water from a water dispensing means.

The need for facilities allowing "hands free" operation of water taps has arisen due to increasing awareness of the dangers associated with transmission of disease via tap handles, the difficulties experienced by handicapped, infirm and arthritic people in operating tap handles and the benefits of conservation through more efficient use of water. It is therefore highly desirable that such facilities be provided, especially in sanitary environments such as hospitals, medical centres and food preparation areas in hotels and restaurants, and more generally in retirement villages, handicapped institutions, schools, sports centres, public toilets and in the home.

Recently, some systems with electronic control have become available and these typically consist of an optical sensor or other electronic sensing device which senses when a user places their hands under a tap and initiates a flow of water in response thereto. The flow of water ceases when the hands are removed from under the tap. These systems have several obvious disadvantages. Firstly, the flow of water cannot be initiated without actually placing an object, such as a hand, under the tap. However in many situations it would be desirable to be able to initiate the flow of water without first getting one's hand or some other object wet. Secondly, these systems allow for the flow of water at one temperature only. It is not possible to select hot, cold or warm water with such prior art systems.

The present invention was developed with a view to providing an improved electronic tap control unit which allows a user to select a flow of water at two or more temperatures without having to operate any tap handles. The invention also includes a system and method of controlling the flow of water using the control unit.

According to one aspect of the present invention there is provided an electronic tap control unit for controlling the flow of water, at preselected first and second temperatures from first and second water supply lines respectively, to a water dispensing means, the unit comprising:

detecting means, in use, located remote from the water dispensing means for detecting a user control input and generating an output signal in response thereto;

logic control means responsive to said output signal for controlling first and second valve means in said first and second water supply lines respectively, said logic control means being responsive to said output signal to activate one or the other of said first and second valve means whereby, in use, a user can select a flow of water from the water dispensing means at either one of said first or second preselected temperatures by supplying said user control input to the detecting means.

Preferably the logic control means includes a timing means whereby said first or second valve means can be activated for a predetermined time interval so that, in use, a user can select a flow of water from the water dispensing means for said predetermined time interval.

Preferably the control unit further comprises indicating means for indicating whether the first temperature or the second temperature has been selected in response to the user supplying the user control input to the detecting means.

The logic control means preferably includes a second timing means whereby said first or second valve means can be activated for a second different predetermined time interval so that, in use, a user can select a flow of water from the water dispensing means for said first or said second predetermined time interval at either one of said first or second preselected temperatures by supplying said user control input to the detecting means.

Preferably the detecting means comprises a proximity sensor and said user control input involves the user placing an object in, or removing an object from, close proximity to the detecting means.

Preferably the logic control means further comprises a sequential selecting means responsive to said user control input for sequentially selecting said first preselected temperature for said first predetermined time interval, said second preselected temperature for said first predetermined time interval, said first preselected temperature for said second predetermined time interval and, then said second preselected temperature for said second predetermined time interval.

Preferably said indicating means is also capable of indicating whether the first or the second predetermined time interval has been selected in response to the user supplying the user control input to the detecting means.

According to another aspect of the present invention there is provided an electronic tap control system for controlling the flow of water to a water dispensing means, the system comprising:

a water supply manifold assembly having first and second inlets for connection to first and second water supply lines respectively, for supplying water at preselected first and second temperatures respectively, and an outlet for connection to said water dispensing means, said first and second inlets having first and second valve means respectively for controlling the flow of water from the first and second water supply lines respectively to the manifold outlet;

a control unit responsive to a user control input to generate a control signal that activates one or the other of said first and second valve means whereby, in use, a user can select a flow of water from the water dispensing means and either one of said first or second preselected temperatures by supplying the user control input.

Preferably said valve means are solenoid valves and said control unit comprises a detecting means, in use, located remote from the water dispensing means for detecting said user control input and generating an output signal in response thereto.

Preferably said control unit further comprises logic control means responsive to said control signal to activate one or the other of said solenoid valves, said logic control means including a timing means whereby said first or second solenoid valves can be activated for a predetermined time interval so that, in use, a user can select a flow of water from the water dispensing means for said predetermined time interval at either one of said first or second preselected temperatures by supplying said user control input to the detecting means.

According to a further aspect of the present invention there is provided a method of controlling the flow of water at preselected first and second temperatures from first and second water supply lines respectively to a water dispensing means using an electronic tap control unit responsive to a user control input to activate one or the other of first and second valve means in the first and second supply lines respectively, the method comprising:

detecting said user control input and in response thereto sequentially selecting said first preselected temperature and then said second preselected temperature;

detecting a change in the user control input and in response to said detection generating a first control signal if the first preselected temperature was selected or generating a second control signal if the second preselected temperature was selected; and     activating said first valve means in response to said first control signal or activating said second valve means in response to said second control signal whereby a user can select a flow of water from the water dispensing means at either one of said first or second preselected temperatures by supplying the user control input.

Preferably the method further comprises terminating said step of sequentially selecting in response to said detection of a change in the user control input.

Preferably said step of detecting a user control input involves sensing whether a user has placed an object in close proximity to a detecting means located remote from the dispensing means, and said step of detecting a change in the user control input involves sensing that the user has removed the object from close proximity to said detecting means.

Preferably said step of sequentially selecting said first and second preselected temperatures comprises sequentially selecting said first preselected temperature for a first predetermined time interval; selecting said second preselected temperature for said first predetermined time interval; selecting said first preselected temperature for a second different predetermined time interval; and, then selecting said second preselected temperature for said second predetermined time interval.

Preferably said first predetermined time interval is relatively short and said second predetermined time interval is relatively long.

In order that the invention may be better understood a preferred embodiment will now be described, by way of example only, with reference to the accompanying drawings in which.

Figure 1:
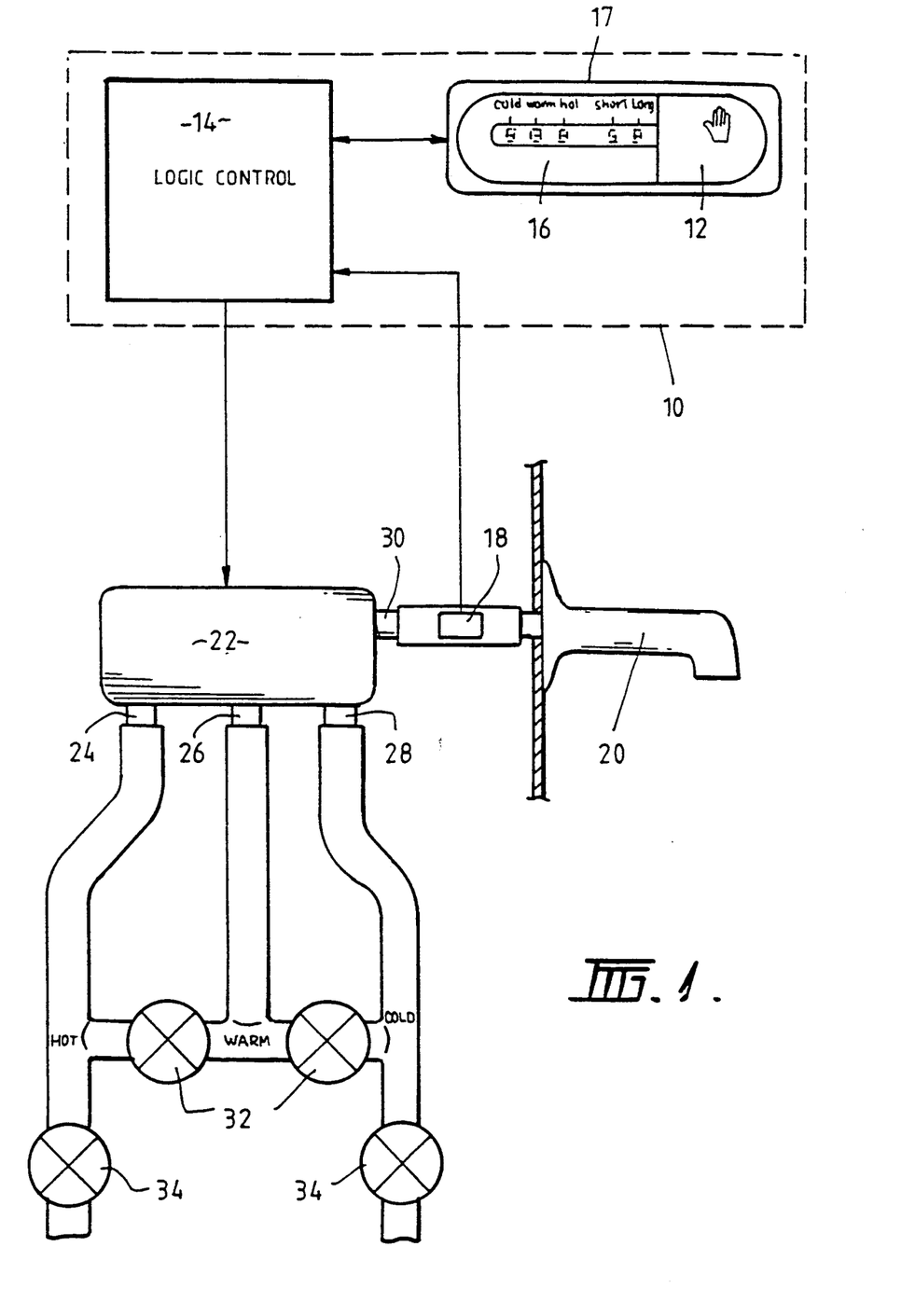
FIG. 1 illustrates schematically an embodiment of the electronic tap control system.

Referring to FIG. 1 there is illustrated schematically a preferred embodiment of the electronic tap control system. The system includes an electronic tap control unit 10 comprising a detecting means 12 for detecting a user control input and generating an output signal in response thereto, and a logic control means 14 responsive to the output signal from the detecting means 12 for controlling the flow of water from the water dispensing means 20. In the present embodiment the detecting means 12 comprises an infra-red (IR) proximity sensor, however any suitable detecting means for detecting a user control input may be employed.

In this embodiment the control unit 10 further comprises an indicating means 16 for indicating to the user which temperature and time duration has been selected for the flow of water from the dispensing means 20. Indicating means 16 comprises a light emitting diode (LED) illuminated display having five LEDs. Three LEDs (green, amber, red) for indicating whether the COLD water, WARM water or HOT water have been selected, and two LEDs for indicating whether the duration of the flow of water selected will be for a relatively SHORT time interval or a relatively LONG time interval.

Advantageously the detecting means 12 and indicating means 16 can be combined in a single wall-mounted panel 17, typically located at eye level above a wash basin or adjacent some other water dispensing facility. The control unit 10 may also be provided with one or more sensing devices, such as an over-temperature sensor 18 located in the inlet pipe to water dispensing means (tap outlet) 20. Sensor 18 may be used to detect when the temperature of the water exceeds one or more predetermined temperature levels and this detection can be used by the logic control means 14 to control the flow of water to the dispensing means 20, for example, to prevent scalding. Water dispensing means 20 is illustrated in FIG. 1 as a single common tap outlet, however obviously the water dispensing means 20 may comprise several tap outlets, a shower head or any other water dispensing device such as a toilet cistern.

In this embodiment the tap outlet 20 is supplied with water from a manifold assembly 22 having first, second and third inlets 24, 26 and 28 respectively, (for connection to hot, warm and cold water supply lines), and an outlet 30 for connection to the tap outlet 20. The manifold assembly 22 is also provided with first, second and third valve means (not shown in FIG. 1) located in the inlets 24, 26 and 28 for controlling the flow of water from the hot, warm and cold water supply lines respectively to the manifold outlet 30 and hence to the tap outlet 20. A preferred embodiment of the manifold assembly 22 will be described further below with reference to FIG. 2.

The warm water supply is provided by mixing water from the hot and cold water supply lines, and mixing valves 32 are provided for this purpose. The temperature of the mixed water is selected by manually setting the two mixing valves 32 during installation. The mixing valves 32 for manual adjustment of the warm water temperature, would not normally be accessible to the general user, but would be located behind a wall plate located, for example, below the wash basin where they are accessible to plumbers or authorised personnel. Hot and cold isolating valves 34 allow the system to be isolated from the rest of the plumbing in the usual manner. A preferred embodiment of the water supply manifold assembly 22 will now be described with reference to FIG. 2.

Figure 2:
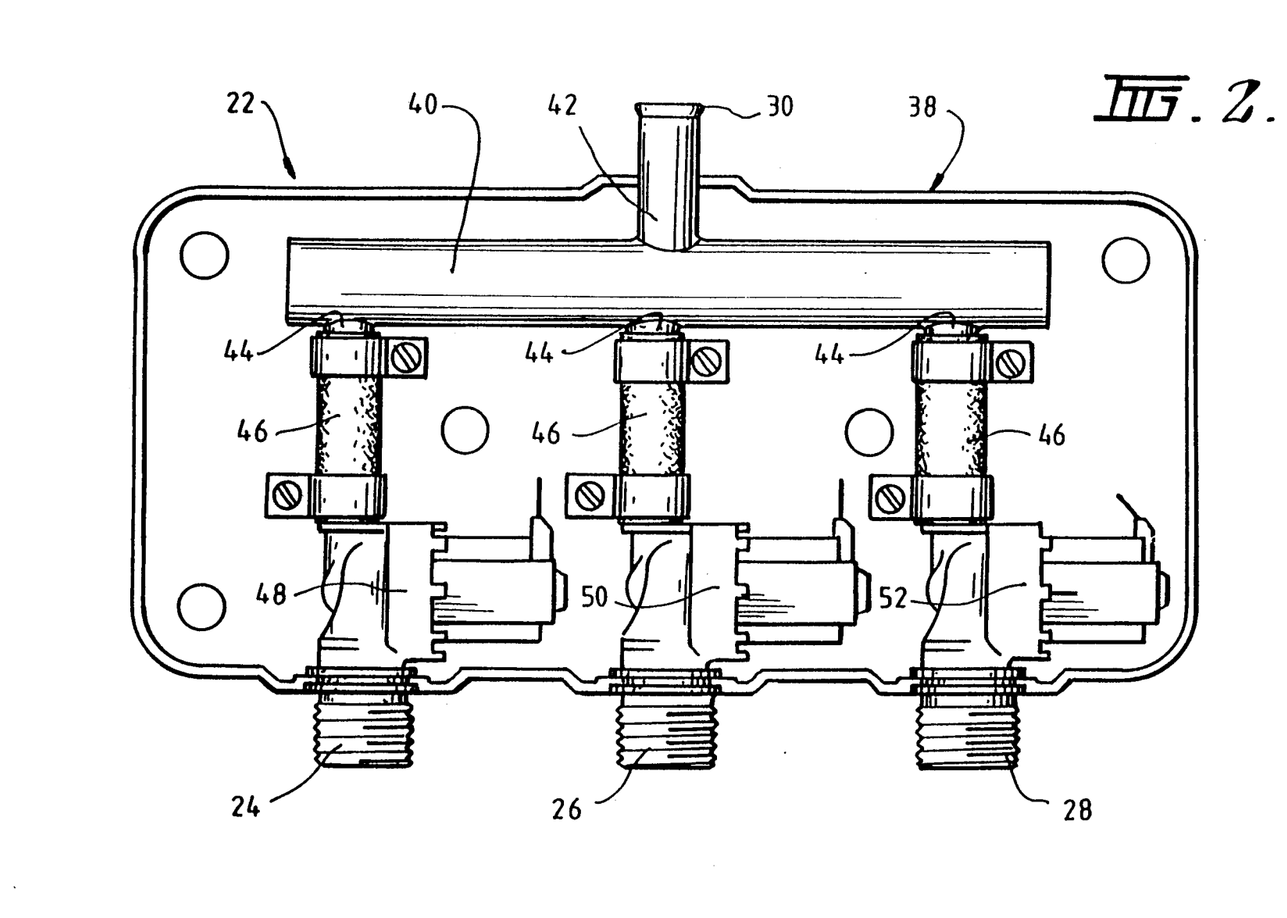
FIG. 2 illustrates in plan view a water supply manifold assembly used in the system of FIG. 1.

In FIG. 2 the water supply manifold assembly 22 comprises a casing 38, housing a piping manifold 40 made from a copper tube. Piping manifold 40 has a copper tube outlet 42, providing the outlet 30 of the assembly 22, and three inlet copper tubes 44 which are connected to respective valve means 48, 50 and 52 by flexible tubes 46. The purpose of the piping manifold 40 is to convert the hot water, cold water and warm water inlets to a single outlet for connection to a common water dispensing means such as tap outlet 20 in FIG. 1.

The valve means 48, 50 and 52 are preferably solenoid valves with low voltage coils, typically 24 volts, of the normally closed type which provide a rapid opening and closing action in response to an actuating control signal. Solenoid valves 48, 50 and 52 are provided in the inlets 24, 26 and 28 of the water supply manifold assembly 22 and thus control the flow of water into the manifold piping 40 from the respective hot water, warm water and cold water supply lines. A preferred method of controlling the flow of water at the various temperatures from the respective water supply lines to the tap 20 using the electronic tap control unit 10 will now be described with reference to FIG. 1 and FIG. 2.

Referring to FIG. 1, when a user wishes to obtain water from the tap outlet 20 he places his hand or some other object over the detecting means 12. Detecting means 12 generates an output signal which is used to trigger a sequential selecting means (not shown) in the logic control means 14 of the control unit 10. Logic control means 14 then automatically sequentially selects the various water flow options available in response to the user control input provided by the user placing his hand over detecting means 12. In this embodiment logic control means 14 automatically selects the various options in the following sequence: cold water—short flow; warm water—short flow; hot water—short flow; cold water—long flow; warm water—long flow; and, hot water—long flow. At the end of the sequence the logic control means 14 resets and the user must remove his hand and place it in front of the detecting means 12 once again in order to provide a control input to restart the sequence over again.

As logic control means 14 selects each of the flow options in sequence, it also illuminates the appropriate LEDs of indicating means 16. So, for example, when the cold water-short flow option is selected the LEDs marked COLD and SHORT are illuminated. In order to select the desired water flow option, the user simply removes his hand from close proximity to the detecting means 12 when the appropriate LEDs are illuminated. The LEDs for each water flow option are illuminated for approximately 1 or 2 seconds each as the logic control means 14 automatically goes through the sequence, in order to allow the user sufficient time to make a decision to remove his hand. When the user removes his hand from close proximity to detecting means 12, logic control means 14 detects the change in the user control input and terminates the sequencing cycle of the sequential selecting means and generates various control signals to activate the appropriate solenoid valve to achieve the desired water flow option. Logic control means 14 also includes timing means (not shown) whereby the solenoid valves in the water supply manifold assembly 22 can be activated for a first or a second predetermined time interval in order to provide the user with the short and long flow options.

Let us assume that by supplying the appropriate user control input the user has selected the hot water-short flow option. The HOT and SHORT LEDs in the display of indicating means 16 will remain illuminated and logic control means 14 will trigger a first timing means providing a time interval of say 5 seconds. At the same time logic control means 14 will send a control signal to the solenoid valve 48 (see FIG. 2) to open the valve and allow the flow of hot water from the hot water supply line into the manifold piping 40 of the water supply manifold assembly 22, and from there through the outlet 30 to the water dispensing tap outlet 20. At the end of the predetermined time interval, as provided by the first timing means in logic control means 40, the control signal to solenoid valve 48 is terminated and the valve closes thus stopping the flow of hot water to the tap outlet 20.

If the hot water option is used infrequently it is not uncommon for the water in the hot water supply line to have cooled down considerably and therefore it is possible that during the short flow option at least, the water that flows from tap 20 will not in fact be very hot on the first attempt. In order to obviate this problem logic control means 14 can employ the output signal provided by the temperature sensor 18 to determine when the hot water from the hot water supply line has risen to an acceptable temperature and will then trigger the first timing means as from that point in time, so that hot water is in fact supplied for the duration of the short flow time interval. During the short period when hot water is rising to the required temperature the logic control means 14 flashes the HOT LED to indicate that the user should wait before using water from the tap if he desires the water to be hot.

Over-temperature sensor 18 may also be employed by the logic control means 14 to detect when the hot water flowing to the tap outlet 20, say during the long flow option, exceeds a safe temperature whereby a user would be in danger of scalding himself if he were to place his hands thereunder. In this event logic control means 14 would close solenoid valve 48 while simultaneously flashing the HOT LED in the display of the indicating means 16, and may optionally open the solenoid valve 52 to immediately provide a flow of cold water to counteract the effects of scalding on the user's hands. This safety facility may be especially advantageous when the system is used in hospitals or in the home where the dangers of scalding are particularly severe. If at any time during a water dispensing time interval the detecting means 12 detects a user control input, (user replaces his hand in front of detecting means 12), logic control means 14 terminates the dispensing cycle by deactivating the solenoid valve and resets to its initial state.

Figure 6A:
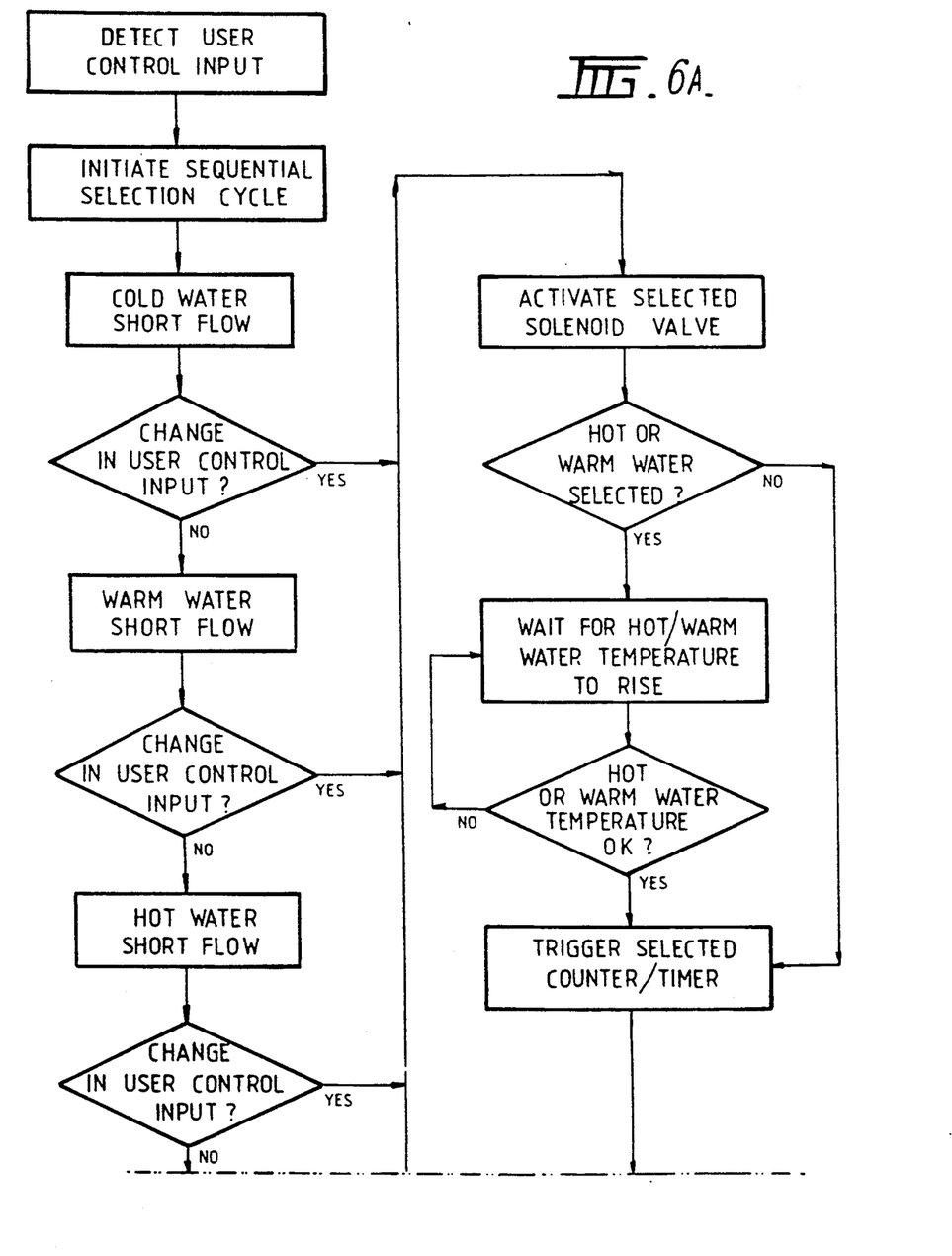
Figure 6B:
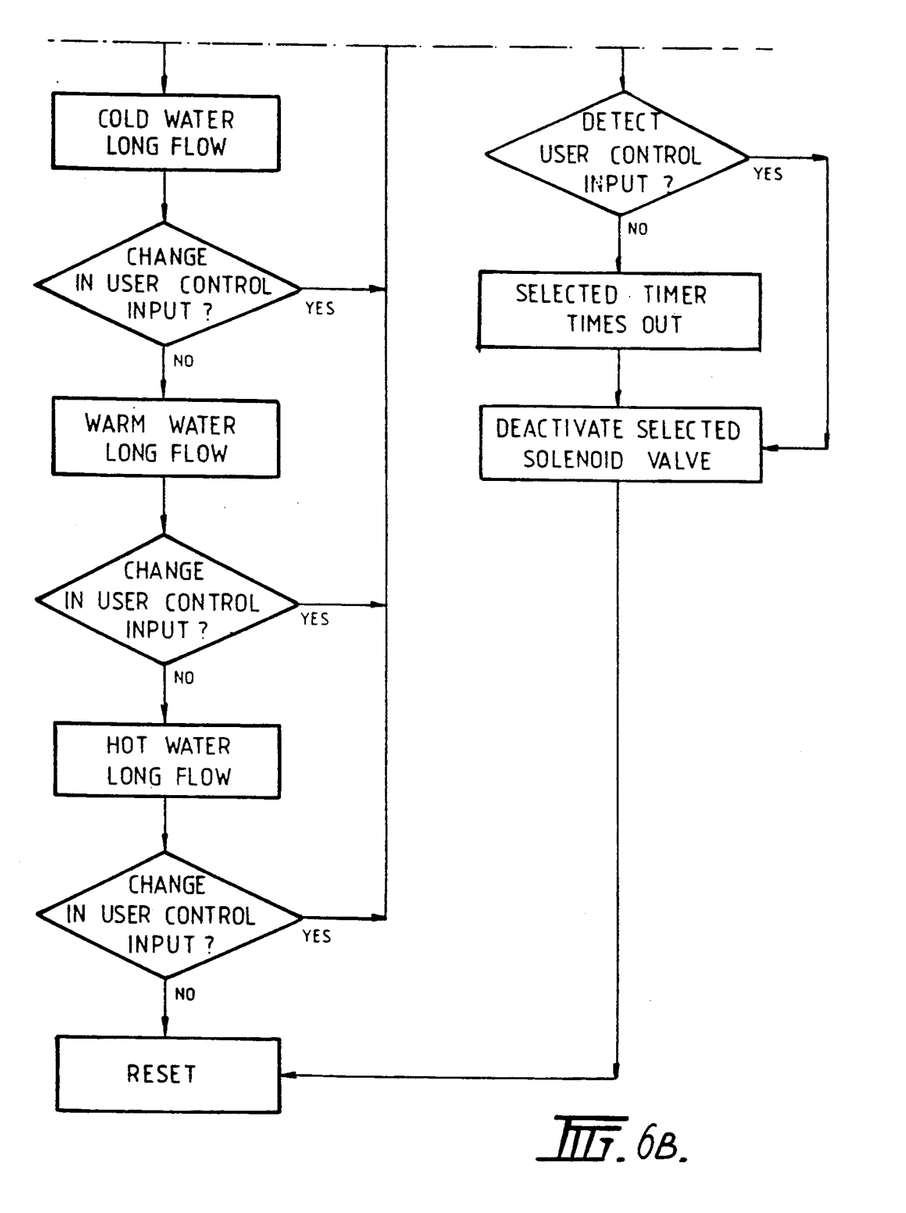

A flow chart illustrating a preferred control sequence of the logic control means 14 in the tap control unit is shown in FIG. 6.

Figure 3:
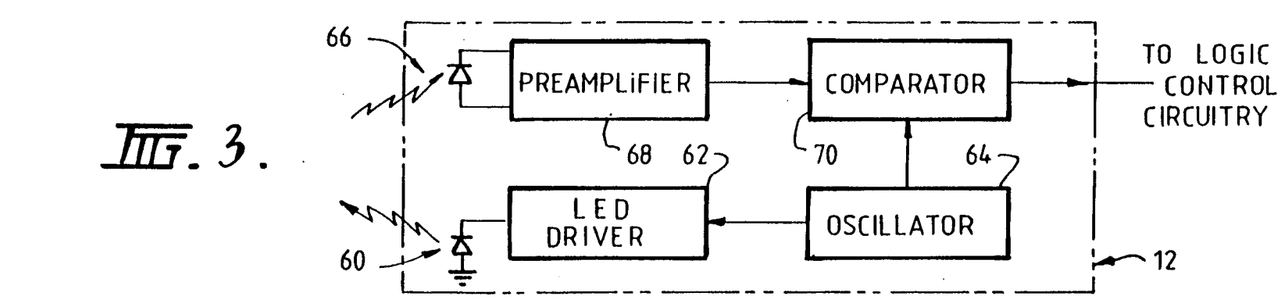
FIG. 3 is a block circuit diagram for one embodiment of a detecting means used in the system of FIG. 1.

One embodiment of a detecting means 12 that can be employed in the system of FIG. 1 will now be described with reference to FIG. 3. Detecting means 12 in FIG. 3 consists of a relatively simple IR proximity detector comprising an IR transmitter LED 60 driven by a driver circuit 62 so as to emit a pulsed IR signal, with a frequency of typically 1 KHz provided by oscillator circuit 64. If an object is placed in front of transmitter LED 60, an IR receiver photodiode 66 mounted adjacent transmitter LED 60 will detect the reflected pulsed signal, which is then amplified by preamplifier circuit 68 before being fed to comparator circuit 70. Comparator circuit 70 compares the level and frequency of the reflected input pulsed signal with a threshold level and the frequency of the oscillator 64, and if a predetermined number, say 100, of consecutive reflected pulses, at the required level and frequency, are detected the output of comparator circuit 70 goes to logical HIGH and remains HIGH until no further reflected pulses are detected. When the object is removed from in front of transmitter LED 60, (the user removes his hand), no further reflected pulses are detected and the output signal of comparator 70 goes to logical LOW. The IR proximity sensor can typically detect an object within a range of about 200 mm in front of detecting means 12.

Figure 4A:
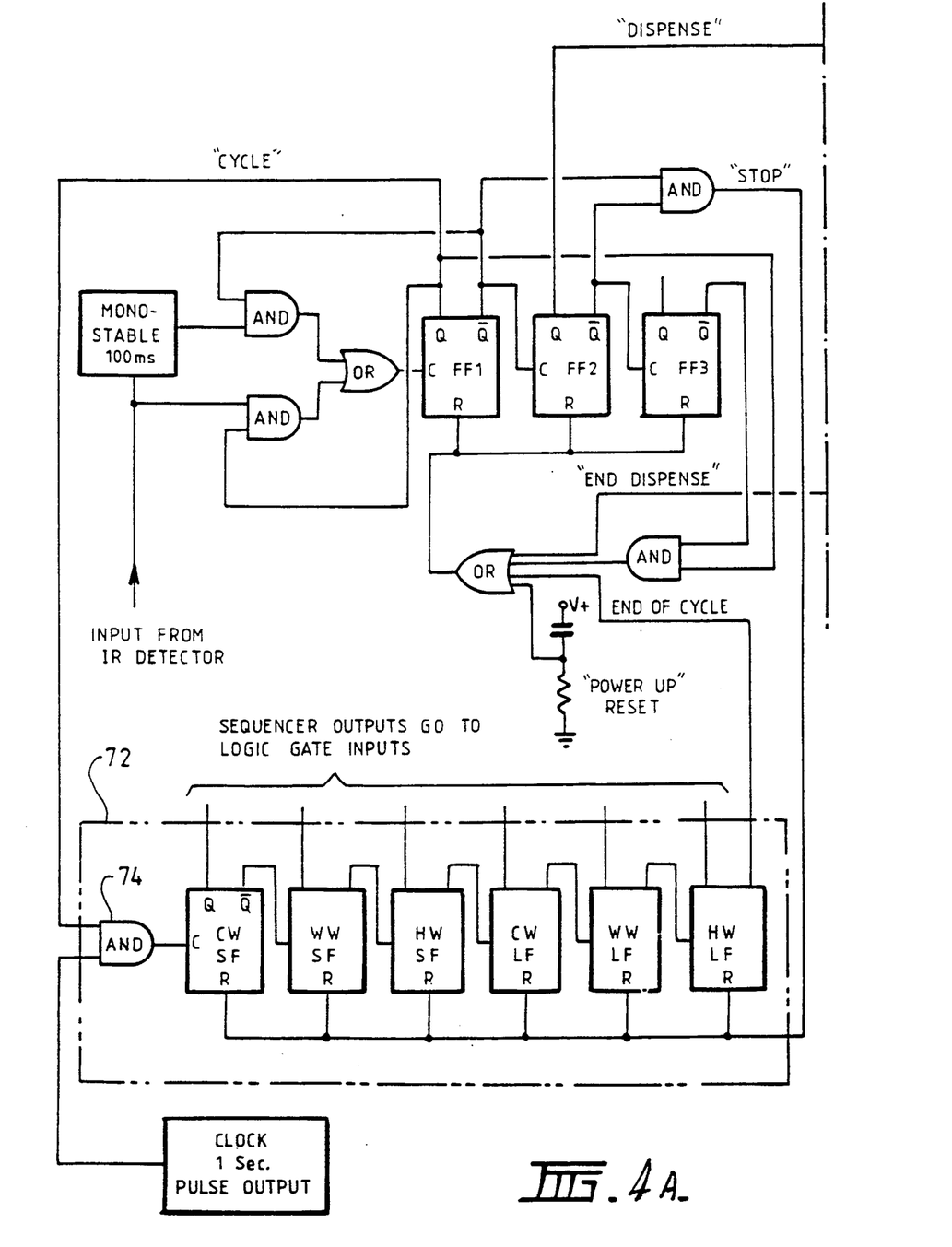
FIGS. 4A and 4B are logic diagrams illustrating one embodiment of a logic control means for the system of FIG. 1.
Figure 4B:
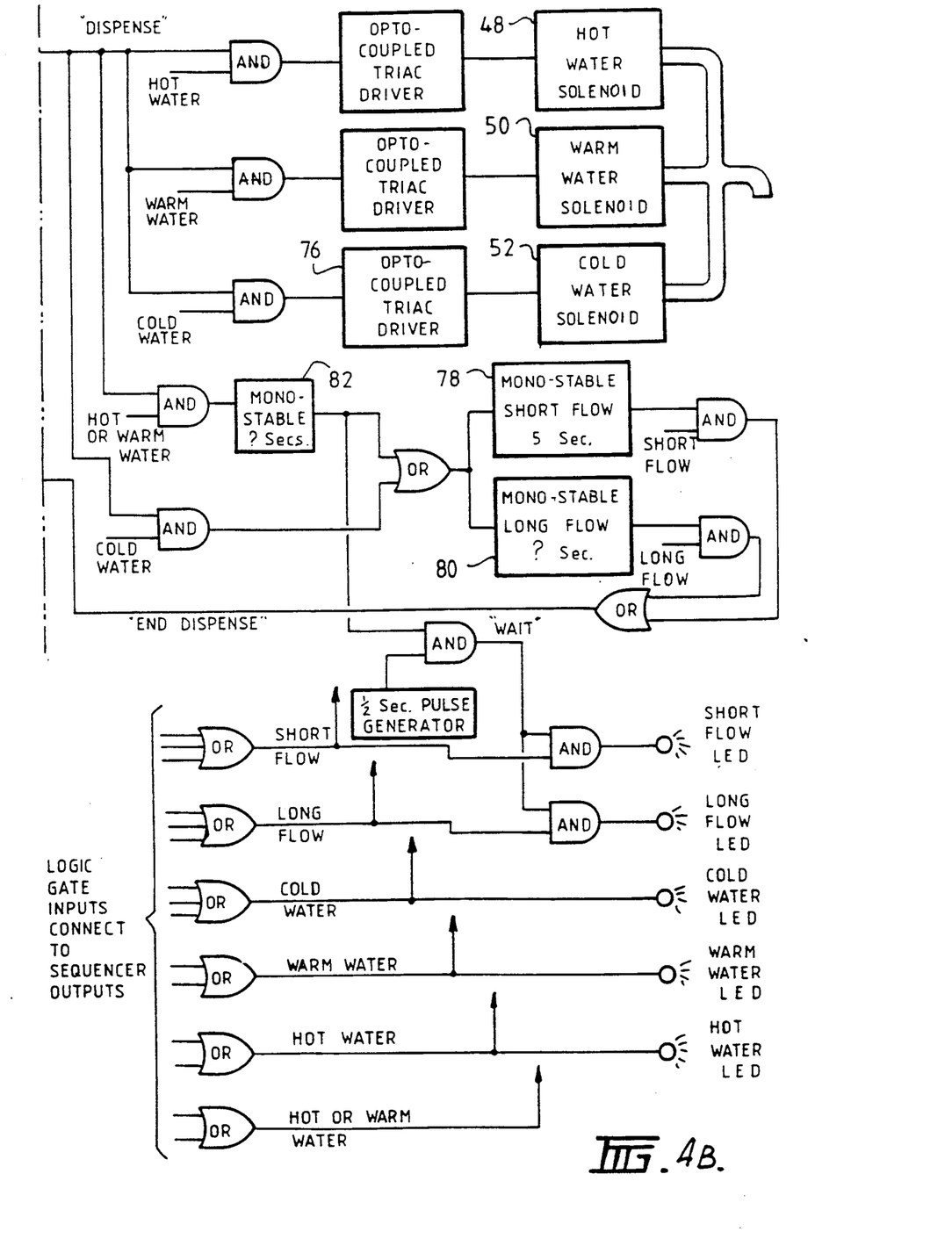

One embodiment of logic control means 14 will now be described with reference to FIG. 4. FIG. 4 is a logic diagram illustrating the interconnection of various logic gates and other digital components to achieve the logical control functions required of the control means 14. Referring to FIG. 4A a logical HIGH (detecting means 12 detects a user control input) on the input line causes flip flop 1 (FF1) to change state so that its output Q goes HIGH and triggers the sequential selecting means 72. Sequential selecting means 72 consists of six flip flops connected in cascade. Each flip flop represents one of the water flow options available to the user, namely: cold water—short flow (CW SF); warm water—short flow (WW SF); hot water—short flow (HW SF); cold water—long flow (CW LF); warm water—long flow (WW LF); and, hot water—long flow (HW LF).

Sequential selecting means 72 sequentially selects each of these water flow options in the sequence as illustrated from left to right, so long as the output Q of FF1 remains HIGH. The Q output of each flip flop in the sequencer 72 goes HIGH and then LOW again as the 1 sec. clock clocks through each flip flop in sequence. If output Q of FF1 goes LOW (detecting means 12 detects a change in the user control input) the sequencer stops, (output of AND gate 74 goes LOW), and whichever flip flop in sequencer 72 with output at logical HIGH remains HIGH.

The outputs of each flip flop in sequencer 72 connect to respective OR gates in FIG. 4B to provide the various flow options and to illuminate the appropriate display LEDs of indicating means 16. So, for example, if sequencer 72 stops on the CW LF flip flop, both the "cold water" and the "long flow" OR gates in FIG. 4B will have logical HIGH applied to one of their inputs and consequently their outputs will go to logical HIGH. However, the output of the "cold water" OR gate is connected to one input of an AND gate, which provides the control signal for the cold water solenoid 52 via an opto-coupled driver circuit 76. Accordingly a control signal will not be generated until the other input to this AND gate also goes HIGH. The other input receives a "dispense" signal which is generated by the output of FF2, which goes HIGH when the output of FF1 goes LOW i.e. when the detecting means 12 detects a change in the user control input. Accordingly, when the user removes his hand the dispense signal is generated and the cold water solenoid is activated. The end of the dispense phase is determined by first and second timing means 78 and 80 providing a short flow and a long flow time interval respectively (see FIG. 4B). A third timing device 82 is illustrated in FIG. 4B for providing an appropriate time interval to allow the hot water or warm water to rise to the required temperature before the short flow or long flow time interval commences.

In the event that the user replaces his hand in front of detecting means 12 whilst the dispense phase is occurring the inverted output of FF3 will be HIGH and together with the output of FF1 will result in all three flip fops being reset, thus terminating the dispense phase and reinitiating the sequencer cycle.

It will be apparent to persons skilled in the art that various other logical control functions can be performed by the circuit of FIG. 4. This circuit or its equivalents, can be realised by the interconnection of corresponding discrete gate circuits and flip flop circuits that are available in integrated circuit form. However, a more preferred realization involves the use of a microprocessor based logic control circuit in which most of the logical control functions are effected by software control. An embodiment of such a microprocessor based logical control circuit will now be described with reference to FIG. 5.

Figure 5:
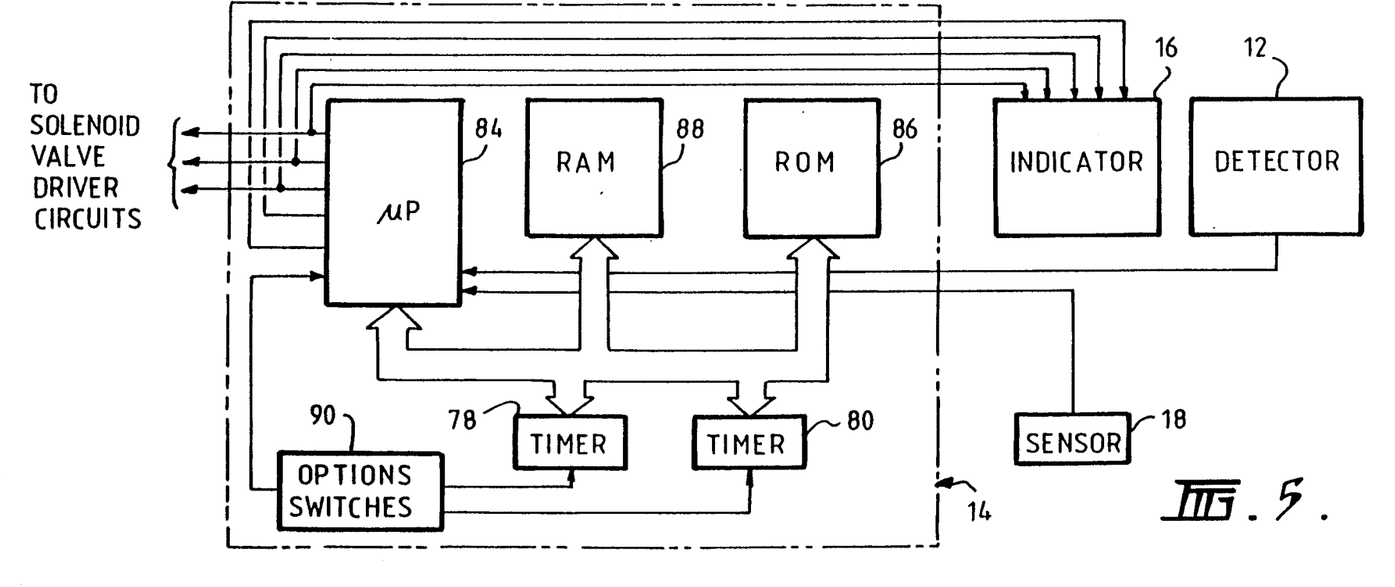
FIG. 5 is a block circuit diagram for an alternative embodiment of a logic control means for the tap control system; and, FIGS. 6A and 6B are flow charts illustrating a preferred control sequence of the logic control means in the tap control unit.

Referring to FIG. 5 there is illustrated in block diagram form one embodiment of a microprocessor based logic control means 14 that can be employed in the control unit 10 of FIG. 1. Logic control means 14 comprises a microprocessor 84, such as an INS 8048 or INS 8049 of the National MCE-10 processor family, with some memory devices including a ROM 86 and RAM 88, providing storage space for the control program and work space for the microprocessor respectively. Microprocessor 84 has one input line connected to detecting means 12 and five output lines connected to indicating means 16 for controlling the COLD, WARM, HOT, SHORT and LONG LEDs as need be. First and second timing means 78 and 80 consist of digital counter/timers and provide the microprocessor 84 with the short and long flow time intervals respectively. Sensor 18 provides microprocessor 84 with over-temperature sensing of the hot and warm water temperature at dispensing means 20. Three output lines from the microprocessor 84 provide control signals for the respective hot, warm and cold water solenoid valves. Switching means 90 allows preselection of various control options for the logic control means 14. Typically switching means 90 consists of a DIP switch unit having five individual switches mounted on the same PCB as the microprocessor 84. Each switch will allow the preselection of certain features or options. For example:
1. SHORT flow time,
2. LONG flow time,
3. WARM/HOT water timer,
4. COLD water only,
5. Tap/cistern.

SHORT and LONG flow time

Flow periods may be selected by DIP switch selection, each flow period having two alternative selections. These may be:

| SHORT | 1. 8 seconds | LONG | 1. 10 minutes |
|---|---|---|---|
|  | 2. 16 seconds |  | 2. 20 minutes. |

WARM/HOT timer

A third DIP switch enables selection of the WARM/HOT water timer for allowing the water temperature to rise to an acceptable level. The two alternative selections may be:
1. Flow timing commences when acceptable water temperature attained, 2. Flow timing commences from the onset of water flow.

Note, even in option 1 the microprocessor 84 times out after a preset time interval, (for example, 1 minute), in the event that hot or warm water is unavailable and therefore the temperature will never rise to an acceptable level. The microprocessor 84 would then reset the control unit.

COLD water only

The cold water only option DIP selection allows the choice of either cold water only operation or the choice of using all three water temperatures. In the cold water only mode the flow timer is available for the SHORT duration only. The SHORT timer will still be adjustable for 8 or 16 seconds.

Tap/Cistern

This option is designed for a specialized application such as, for example, a toilet cistern. Upon detection of a user control input the microprocessor 84 verifies that the user control input is maintained for at least five seconds. Upon verification a nominal thirty second timer is triggered after which the cold water solenoid is activated for the selected SHORT duration. Any further detection of a user control input during this cycle is ignored. Upon completion of the cycle the procedure can be repeated.

The above control features or options are merely exemplary and are in no way limitive of the possible options that can be provided on the control unit 10. To persons skilled in the electronics arts it will be obvious that many other features and options could be included with only minor modifications to the above described circuit arrangement.

Throughout the description we have assumed that only three water temperatures would be required: COLD, WARM and HOT. Obviously the system described is applicable whether more or less than simply these three temperatures are required. The system can be modified to incorporate the required number of solenoid valves and LEDs for indicating means 16, if desired. Likewise the duration of the SHORT and LONG flow time intervals can be modified to suit the application. Furthermore, time intervals other than the basic SHORT and LONG time intervals can be provided, with the possibility of the user actually nominating a time interval on a sliding scale.

Detecting means 12 is most preferably a proximity sensor, such as the IR proximity sensor described, since this means that the user does not need to physically touch any controls to supply a user control input. However, in some situations it may be necessary to provide a physical control facility, such as a foot operated switch or a simple press button, which can be depressed to provide the user control input. It will be appreciated that the detecting means 12 is not limited to a remote sensing device such as the IR proximity sensor described. Any device capable of detecting a simple ON/OFF user control input will suffice.

It will be apparent to those skilled in the relevant arts that many other variations and modifications can be made to the system and method described, other than those already specifically mentioned, without departing from the basic concepts of the invention. All such variations and modifications are to be considered within the scope of the invention the nature of which is to be determined from the foregoing description.

The claims defining the invention are as follows:

1. An electronic tap control unit for controlling the flow of water, at preselected first and second temperatures from first and second water supply lines respectively, to a water dispensing means, the unit comprising:

detecting means, in use, located remote from the water dispensing means for detecting a user control input and generating an output signal is response thereto;

logic control means responsive to said output signal for controlling first and second valve means in said first and second water supply lines respectively, said logic control means being responsive to said output signal to activate one or the other can select a flow of water from the water dispensing means at either one of said first or second preselected temperatures by supplying said user control input to the detecting means, wherein the logic control means further comprises a sequential selecting means responsive to said user control input for sequentially selecting said first preselected temperature for said first predetermined time interval said second preselected temperature for said first predetermined time interval, said first preselected temperature for said second predetermined time interval and, then said second preselected temperature for said second predetermined time interval.

2. The control unit of claim 1, wherein the logic control means includes a timing means whereby said first or second valve means can be activated for a predetermined time interval so that, in use, a user can select a flow of water from the water dispensing means for said predetermined time interval.

3. The control unit of claim 1, wherein the control unit further comprises indicating means for indicating whether the first temperature or the second temperature has been selected in response to the user supplying the user control input to the detecting means.

4. The control unit of claim 1, wherein the logic control means includes a second timing means whereby said first or second valve means can be activated for a second different predetermined time interval so that, in use, a user can select a flow of water from the water dispensing means for said first or said second predetermined time interval at either one of said first or second preselected temperatures by supplying said user control input to the detecting means.

5. The control of claim 1, wherein the detecting means comprises a proximity sensor and said user control input involves the user placing an object in, or removing an object from, close proximity to the detecting means.

6. The control unit of claim 1, wherein said indicating means is also capable of indicating whether the first or the second predetermined time interval has been selected in response to the user supplying the user control input to the detecting means.

7. An electronic tap control unit for controlling the flow of water, at preselected first and second temperatures from first and second water supply lines respectively, to a water dispensing means, the unit comprising:

detecting means, in use, located remote from the water dispensing means for detecting a user control input and generating an output signal in response thereto;

logic control means responsive to said output signal for controlling first and second valve means in said first and second water supply lines respectively, said logic control means being responsive to said output signal to activate one or the other of said first and second valve means whereby, in use, a user can select a flow of water from the water dispensing means at either one of said first or second preselected temperatures by supplying said user control input to the detecting means, wherein said logic control means controls said first and second valve means in accordance with a predetermined sequence to open the first and second valve means a predetermined amount and for a predetermined time interval to provide a plurality of selected temperature and time intervals for supply of water, said detecting means causing said logic control means to commence said predetermined sequence upon receipt of said output signal and causing said sequence to stop at a desired one of said selected temperatures and time intervals when said user control input is removed from the vicinity of the detecting means.

8. A method of controlling the flow of water at preselected first and second temperatures from first and second water supply lines respectively to a water dispensing means using an electronic tap control unit responsive to a user control input to activate on or the other of first and second valve means in the first and second supply lines respectively, the method comprising:

detecting said user control input and in response thereto sequentially selecting said first preselected temperature and then said second preselected temperature;

detecting a change in the user control input and in response to said detection generating a first control signal if the first preselected temperature was selected or generating a second control signal if the second preselected temperature was selected; and activating said first valve means in response to said first control signal or activating said second valve means in response to said second control signal whereby a user can select a flow of water from the water dispensing means at either one of said first or second preselected temperatures by supplying the user control input, wherein said step of sequentially selecting said first and second preselected temperatures comprises sequentially selecting said first predetermined time interval; selecting said first preselected temperature for a second different predetermined time interval; and, then selecting said second preselected temperature for said second predetermined time interval.

9. The method of claim 8, wherein said first predetermined time interval is relatively short and said second predetermined time interval is relatively long.

* * * * *

UNITED STATES PATENT AND TRADEMARK OFFICE
CERTIFICATE OF CORRECTION

PATENT NO.   : 5,095,945

DATED        : March 17, 1992

INVENTOR(S)  : Phillip H. Jensen

It is certified that error appears in the above-identified patent and that said Letters Patent is hereby corrected as shown below:

Col. 10, line 14, after "other", insert --of said first and second valve means whereby, in use, a user--.

Col. 10, line 23, insert --,-- after interval.

Col. 12, line 19, after "first" insert --Preselected temperature for a first Predetermined time interval; selecting said second Preselected temperature for said first Predetermined.--

Signed and Sealed this

Sixteenth Day of November, 1993

Attest:

BRUCE LEHMAN

*Attesting Officer*   *Commissioner of Patents and Trademarks*